(12) United States Patent
Harwin et al.

(10) Patent No.: US 9,746,077 B2
(45) Date of Patent: Aug. 29, 2017

(54) ASSEMBLY AND METHOD OF MANUFACTURE THEREOF

(75) Inventors: Neil Harwin, Leamington Spa (GB); Gary Moyce, Barford (GB)

(73) Assignee: Jaguar Land Rover Limited, Whitley, Conventry, Warwickshire (GB)

( * ) Notice: Subject to any disclaimer, the term of this patent is extended or adjusted under 35 U.S.C. 154(b) by 429 days.

(21) Appl. No.: 14/117,076

(22) PCT Filed: May 10, 2012

(86) PCT No.: PCT/EP2012/058702
§ 371 (c)(1),
(2), (4) Date: Mar. 17, 2014

(87) PCT Pub. No.: WO2012/152897
PCT Pub. Date: Nov. 15, 2012

(65) Prior Publication Data
US 2015/0145287 A1    May 28, 2015

(30) Foreign Application Priority Data
May 11, 2011   (GB) .................................. 1107828.4

(51) Int. Cl.
*F16J 15/06*         (2006.01)
*B60R 13/06*         (2006.01)
(Continued)

(52) U.S. Cl.
CPC ........... *F16J 15/06* (2013.01); *B60R 11/0217* (2013.01); *B60R 13/06* (2013.01); *B62D 25/20* (2013.01);
(Continued)

(58) Field of Classification Search
CPC ........... B60R 13/06; F16K 27/00; F16J 15/06; B62D 25/20
See application file for complete search history.

(56) References Cited

U.S. PATENT DOCUMENTS

| | | |
|---|---|---|
| 4,105,481 A | 8/1978 | Lofdahl |
| 5,344,208 A | 9/1994 | Bien et al. |

(Continued)

FOREIGN PATENT DOCUMENTS

| | | |
|---|---|---|
| CN | 1478676 A | 3/2004 |
| CN | 101568464 A | 10/2009 |

(Continued)

OTHER PUBLICATIONS

International Search Report for PCT/EP2012/058702 dated Mar. 8, 2013, 8 pages.

(Continued)

*Primary Examiner* — Glenn Dayoan
*Assistant Examiner* — Melissa A Black
(74) *Attorney, Agent, or Firm* — Reising Ethington P.C.

(57) ABSTRACT

In one aspect of the invention there is provided a method of manufacture of an assembly comprising: forming an assembly by coupling a first component (150) to a second component (110) in spaced apart relationship therewith by means of coupling means (131); providing thermally activated seal means between the components, the first component, second component and seal means being arranged such that a gap exists between the first and second components allowing fluid flow therethrough; and subjecting the assembly to heat thereby to cause the seal means to expand and bridge the gap between the first and second components thereby to form a fluid tight seal between them. The second component may be at least partially enclosed between the first and a third component (161), and the second component may provide an aperture at a location opposite a portion of the third component whereby expansion of a seal means (112S,114S) around the aperture causes the aperture to be sealed by the seal means and said portion of the third component.

14 Claims, 9 Drawing Sheets

(51) Int. Cl.
*F16K 27/00* (2006.01)
*B62D 25/20* (2006.01)
*B60R 11/02* (2006.01)
*B62D 25/24* (2006.01)
*B62D 29/00* (2006.01)

(52) U.S. Cl.
CPC ............ *B62D 25/24* (2013.01); *B62D 29/002* (2013.01); *F16K 27/00* (2013.01); *Y10T 29/49826* (2015.01); *Y10T 137/0318* (2015.04)

(56) References Cited

U.S. PATENT DOCUMENTS

| | | | |
|---|---|---|---|
| 5,766,719 | A | 6/1998 | Rimkus |
| 5,852,854 | A | 12/1998 | Pierrot et al. |
| 6,114,004 | A | 9/2000 | Cydzik et al. |
| 6,199,940 | B1 | 3/2001 | Hopton et al. |
| 6,382,635 | B1 | 5/2002 | Fitzgerald |
| 7,726,442 | B2 * | 6/2010 | Belpaire ............ B62D 29/002 181/204 |
| 8,469,143 | B2 | 6/2013 | Prunarety et al. |
| 8,675,907 | B2 * | 3/2014 | Kirsch ............... B60R 11/0217 381/386 |
| 2002/0117811 | A1 | 8/2002 | Kobmann et al. |
| 2003/0183444 | A1 * | 10/2003 | Cass ..................... H04R 5/02 181/152 |
| 2004/0070232 | A1 | 4/2004 | Mourieras et al. |
| 2007/0100060 | A1 | 5/2007 | Tahri et al. |
| 2008/0110694 | A1 | 5/2008 | Niezur et al. |
| 2009/0001758 | A1 | 1/2009 | Hanley, IV et al. |
| 2009/0085379 | A1 | 4/2009 | Takahashi et al. |

FOREIGN PATENT DOCUMENTS

| | | |
|---|---|---|
| CN | 101827746 A | 9/2010 |
| EP | 1134126 A2 | 3/2001 |
| EP | 1798133 | 6/2007 |
| JP | 2004004445 A | 1/2004 |
| JP | 2004208067 A | 7/2004 |
| WO | WO2008059012 | 5/2008 |
| WO | WO2010069339 A1 | 6/2010 |

OTHER PUBLICATIONS

Notice of Reasons for Rejection, in Japanese with English summary, corresponding to JP application No. 2014-509743, dated Mar. 29, 2016, 10 pages.
UK combined search and examination report corresponding to application No. GB1107828.4, dated Sep. 7, 2011, 6 pages.
UK examination report corresponding to application No. GB1107828.4, dated Jul. 23, 2013, 2 pages.
Chinese Office action for CN application No. 201280034433.8, dated Jun. 30, 2015, 12 pages.

* cited by examiner

ASSEMBLY AND METHOD OF MANUFACTURE THEREOF

FIELD OF THE INVENTION

The present invention relates to an assembly and to a method of manufacturing an assembly. In particular but not exclusively the invention relates to a method of manufacturing an assembly in which is required to form a fluid tight seal between components. Aspects of the invention relate to an assembly and to a method of manufacturing an assembly for a motor vehicle.

BACKGROUND

It is known to provide a vehicle audio system in which a sub-woofer is provided under a seat of a driver or passenger or in a luggage compartment of the vehicle. Sub-woofers are typically required to occupy a not inconsiderable amount of space in order to provide acceptable audio performance. It is desirable to provide a sub-woofer of reduced size in order to reduce an amount of cabin or payload space (such as boot space) occupied by the sub-woofer.

It is an aim of some embodiments of the present invention to at least partially mitigate the disadvantages of known sub-woofers.

Some embodiments of the invention provide an improved method of assembly of a vehicle, watercraft of aircraft.

Some embodiments of the invention provide an improved method of assembly of a vehicle, watercraft or aircraft having a ballast tank.

STATEMENT OF THE INVENTION

Embodiments of the invention provide a method, an assembly, a vehicle, a watercraft and an aircraft. Embodiments of the invention may be understood by reference to the appended claims.

In one aspect of the invention for which protection is sought there is provided a method of manufacture of an assembly comprising: forming an assembly by coupling a first component to a second component in spaced apart relationship therewith by means of coupling means; providing thermally activated seal means between the first and second components, the first component, second component and seal means being arranged such that a gap exists between the first and second components allowing fluid flow therebetween; and subjecting the assembly to heat thereby to cause the seal means to expand and bridge the gap between the first and second components thereby to form a fluid tight seal between the components.

Some embodiments of the invention have the advantage that the first and second components may be coupled to one another, immersed in a liquid, removed from the liquid to allow fluid to drain from the assembly through the gap and subsequently heat treated to seal the gap without a requirement for operator or tool access to the assembly to seal the gap.

Some embodiments of the invention offer a particular advantage in the fabrication of components where a waterproof and/or airtight seal is required to be made between two components that become inaccessible during a process of manufacture before the assembly is subjected to a coating or other treatment requiring immersion of the assembly in a liquid such as an anti-corrosion liquid or other treatment.

The presence of the gap between the first and second components allows the liquid to flow between and around the components. Once the treatment is completed any excess liquid may drain from the components through the gap before the components are subject to a thermal treatment to cause expansion of the seal means to seal the gap.

It is to be understood that because operator or tool access to the components is not required, the first and second components may for example be contained within a third component and be substantially inaccessible to an operator or tool without compromising an ability to form a fluid tight seal between the first and second components.

The seal means may comprise a thermally activated mastic arranged to expand upon heating. The seal means may be provided in the form of a layer of mastic, for example in the form of a gasket or like continuous loop of mastic. The seal means may alternatively be in the form of a discontinuous strip of mastic.

It is to be understood that the first component may at least partially enclose the second component.

Advantageously the method may comprise the step of providing a third component such that the second component is at least partially enclosed by the first and third components before the step of subjecting the first assembly to heat.

The second component may be substantially fully enclosed by the first and third components.

It is to be understood that the first and/or third components may have apertures therein such that the second component is visible through the apertures and still be partially or fully enclosed by the first and third components.

Further advantageously the method may comprise the step of coupling the third component to one or both of the first and second components.

Optionally the third component is in the form of a single unitary component. Alternatively the third component may comprise a plurality of sub-components, the method comprising the step of assembling the third component from the plurality of sub-components.

Optionally one or both of the first and second components may comprise a single unitary component. Alternatively one or both of the first and second components may comprise a plurality of sub-components.

Advantageously the method may comprise providing seal means between the third component and one or both of the first and second components such that a gap exists between the third component and said one or both of the first and second components such that fluid may pass through the gap and drain from the assembly before subjecting the assembly to heat.

This feature has the advantage that in some arrangements the seal means enables the third component to provide support to the first and/or second component by bridging the gap after expansion of the seal means.

It is to be understood that in some embodiments the seal means may bridge the gap before and after the seal means expands.

Optionally the step of providing seal means between the third component and one or both of the first and second components comprises providing the seal means such that expansion of the seal means causes a fluid tight seal to be formed between the third component and said one or both of the first and second components.

Advantageously the method may comprise the step of exposing the assembly to a fluid before subjecting the assembly to heat to form the fluid tight seal.

Further advantageously the method may comprise the step of providing the second component in a shape defining a tray having a free peripheral edge facing the first component whereby expansion of the seal means causes a fluid tight seal to be provided between the first and second components around the peripheral edge of the second component.

The method may comprise the step of forming an aperture in the first component thereby to allow access to an interior of the tray defined by the second component.

This feature has the advantage that the interior of the second component may be employed for a purpose such as storage of equipment, vehicle components or passenger personal items or luggage. Thus in the event the second component is in the form of a tray the tray may provide a useful volume for storage or other purposes. For example the tray may provide a useful volume as a cavity of an audio system as described below, a fluid reservoir and other useful purposes.

Optionally the method may comprise the step of providing at least one aperture in the second component to allow flow of fluid through the second component via said aperture.

This feature has the advantage that fluid such as a liquid or a gas may pass from one side of the second component to the other.

This may be useful during manufacture, for example when the assembly is subject to an electro-coating process such as an electrophoretic deposition process commonly known as an e-coat dipping process. In such a process the assembly may be dipped in a bath of e-coat fluid such as a primer, paint or any other suitable fluid in order to form a coating of e-coat fluid over the assembly. Such processes are typically employed in the automotive industry, where a vehicle body may be subject to the dipping process. In some applications it is required to ensure that substantially all surfaces of the assembly are coated with fluid when the assembly is dipped in the fluid. Accordingly, the presence of the aperture in the second component may be useful in ensuring the second component is flooded with fluid during the dipping process.

Advantageously the method may comprise providing thermally activated seal means around one said at least one aperture in the second component.

It is to be understood that reference to one said at least one aperture is not to be understood to exclude the possibility that more than one aperture has the feature described, in the present case the feature of thermally activated seal means therearound.

In some embodiments valve means may be provided to selectively allow or prevent flow of fluid through the second aperture when required.

It is to be understood that some embodiments of the invention may be suitable for providing a ballast tank in or on or under a structure. For example a ballast tank of a motor vehicle or water craft. The tank may be arranged to be flooded and/or drained by opening or closing the valve means.

The valve means may be coupled to or formed integrally with the aperture. Alternatively the valve means may be associated with a fluid conduit such as a hose or other conduit that may be arranged to deliver a supply of fluid to the ballast tank. The aperture may be provided in a lower region of the ballast tank with respect to an in-use orientation of the assembly.

The method may comprise the step of providing at least one aperture in the third component.

This feature has the advantage that in some arrangements fluid may flow through the third component to flood a volume between the second and third components.

Optionally the method comprises providing the aperture in the second component at a location of the second component opposite a portion of the third component whereby expansion of the seal means around the aperture causes the aperture to be sealed by the seal means and said portion of the third component thereby to prevent flow of fluid through the second component via said aperture.

Advantageously the method may comprise the step of providing one said at least one aperture in the third component at a location displaced with respect to the aperture in the second component such that when the seal means around said one at least one aperture in the second component expands substantially no portion of the at least one aperture in the third component overlaps said one at least one aperture in the second component whereby said one at least one aperture in the second component may be sealed closed.

This feature has the advantage that the assembly may be formed such that no direct path exists for the flow of fluid through the aperture in the third component and subsequently through the aperture in the second component.

Advantageously the method may comprise the step of providing valve means for controlling flow of fluid into or out from one said at least one aperture in the second component in use.

The step of providing valve means may comprise one selected from amongst the steps of coupling the valve means to the second component, forming the valve means integrally with the second component and providing the valve means in a fluid conduit through which fluid may pass to fill or drain the second component.

Optionally the step of providing valve means comprises providing valve means for controlling flow of fluid through the second and third components to fill or drain the second component.

The method may comprise providing the first component in the form of a floorpan assembly.

Optionally the third component may comprise an underframe or understructure, a chassis, a ladder frame assembly, a monocoque structure or any other structure. The third component may be a portion of a motor vehicle, a watercraft, an aircraft or any other suitable structure.

Advantageously the step of providing the third component such that the second component is at least partially enclosed by the first and third components may comprise the step of providing the second component within a longitudinal portion or cross-member portion of the third component.

Optionally the step of providing the third component such that the second component is at least partially enclosed by the first and third components comprises the step of providing the second component within a longitudinal member or a cross member of the third component, such as a longitudinal member or cross member of an underframe or understructure, chassis, ladder frame assembly, monocoque or any other suitable structure.

This has the advantage that in some embodiments space that is otherwise not utilised may be utilised to the benefit of the driver or vehicle, in this case a hollow of a longitudinal member or cross member, optionally a beam member.

Other structural members also provide useful space for the location of the second component.

Optionally the method is a method of manufacture of an assembly to form part of one selected from amongst a motor vehicle, a watercraft and an aircraft.

Advantageously the method may comprise providing the aperture in the first component such that it is accessible from an interior of the motor vehicle, watercraft or aircraft.

Advantageously the second component may define an air cavity of an audio speaker system.

Further advantageously the second component may define a portion of a sub-woofer of an audio system.

Alternatively the second component may define a tank of a ballast system. The ballast system may be employed to increase a weight and/or reduce a buoyancy of the assembly when required. For example where the assembly forms part of a vehicle it may be useful to reduce buoyancy of the vehicle when the vehicle is wading. This may be helpful in increasing a weight on wheels of the vehicle to enable or improve traction between the wheels and a driving surface, for example a river bed or flooded road.

In a further aspect of the invention there is provided an assembly formed by the method of the preceding aspect.

In an aspect of the invention for which protection is sought there is provided an assembly comprising: a first component and a second component coupled to one another in spaced apart relationship by means of coupling means; and thermally activated seal means between the first and second components, the first component, second component and seal means being arranged such that a gap exists between the first and second components allowing fluid flow therebetween; wherein the seal means comprises thermally activated seal means arranged to expand upon heating to bridge the gap between the first and second components thereby to form a fluid tight seal between the components.

The assembly may comprise a third component wherein the first and third components at least partially enclose the second component.

The second component may be substantially fully enclosed by the first and third components.

Advantageously the third component may be coupled to one or both of the first and second components.

Further advantageously the second component may be provided with at least one aperture therein to allow flow of fluid into or out from the second component.

Still further advantageously thermally activated seal means may be provided around the one said at least one aperture in the second component, the seal means being arranged to form a seal between the second and third components upon heating.

The seal means around the one said at least one aperture in the second component may be provided at a location of the second component opposite a portion of the third component wherein expansion of the seal means causes the one said at least one aperture in the second component to be closed by the seal means and said portion of the third component thereby to prevent flow of fluid into or out from the second component via the one said at least one aperture.

Optionally at least one aperture is provided in the third component.

This feature has the advantage that fluid may flow through the third component to flood a volume between the second and third components.

Advantageously one said at least one aperture in the third component may be provided at a location displaced laterally with respect to the at least one aperture in the second component such that when the seal means around the at least one aperture in the second component expands to form a seal between the second and third components no portion of the at least one aperture in the third component overlaps the at least one aperture in the second component.

This feature has the advantage that no direct path exists for the flow of fluid through the aperture in the third component and subsequently through the aperture in the second component.

Further advantageously the second component may comprise a tray, the seal means between the first and second components being provided around a peripheral edge of the tray, the seal means being arranged on heating to expand away from the peripheral edge of the tray to bridge a gap between the peripheral edge and the first component thereby to form the fluid tight seal therebetween.

The assembly may comprise valve means for controlling flow of fluid into or out from the second component via one said at least one aperture.

The valve means may be one selected from amongst coupled to the second component, formed integrally with the second component and provided in a fluid conduit through which fluid may pass to fill or drain the second component.

The valve means may be arranged to control flow of fluid through the second and third components to allow filling or draining of the second component.

Optionally an aperture is provided in the first component allowing access to an interior of the tray.

Advantageously the first component may comprise a floorpan assembly of a motor vehicle.

Further advantageously the third component may comprise one selected from amongst an underframe or understructure, a chassis, a ladder frame assembly and a monocoque.

Still further advantageously the second component may be provided within a longitudinal portion or cross-member portion of the third component.

Optionally the second component may define an air cavity of an audio speaker system. The second component may define a portion of a sub-woofer of an audio system.

In an aspect of the invention for which protection is sought there is provided a vehicle, watercraft or aircraft comprising an assembly according to the preceding aspect.

In one aspect of the invention for which protection is sought there is provided an assembly comprising a floorpan assembly and a baffle tray, the baffle tray comprising a tray portion and a seal member provided around a peripheral edge of the tray portion, the baffle tray being supported in spaced apart relationship with the floorpan assembly, the seal member comprising thermally activated seal means, the seal means being arranged on heating to expand away from the peripheral edge to bridge a gap between the peripheral edge of the tray and the floorpan assembly thereby to form a fluid tight seal therebetween around the peripheral edge of the tray.

Advantageous features of the invention are mentioned in the following description and in the claims appended hereto.

Within the scope of this application it is envisaged that the various aspects, embodiments, examples, features and alternatives set out in the preceding paragraphs, in the claims and/or in the following description and drawings may be taken independently or in any combination thereof. Features described in connection with one embodiment are applicable to all embodiments unless there is an incompatibility of features.

BRIEF DESCRIPTION OF THE DRAWINGS

Embodiments of the invention will now be described with reference to the accompanying figures in which.

DETAILED DESCRIPTION

Figure 1:
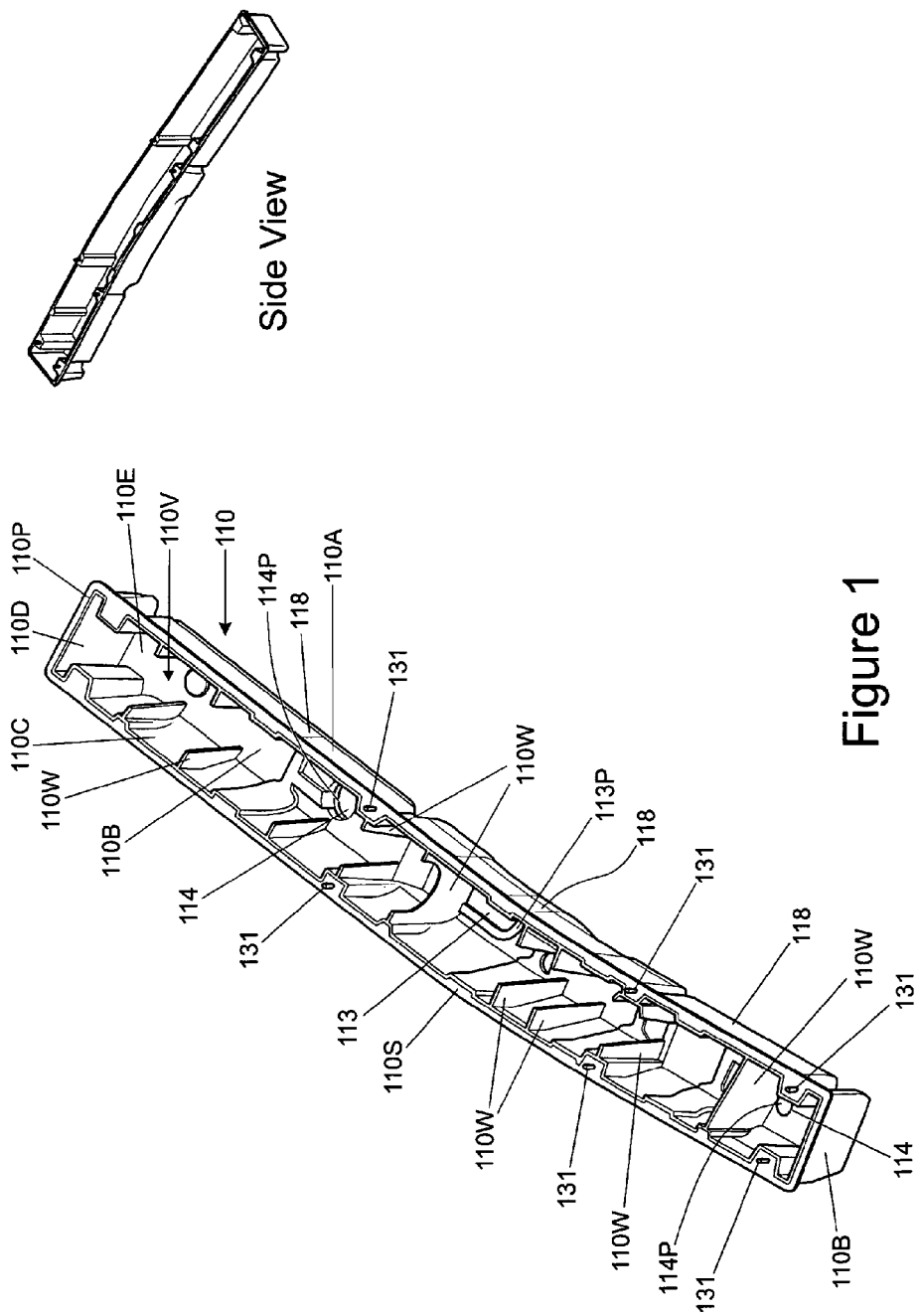
FIG. 1 is a perspective view of a sub-woofer baffle tray according to an embodiment of the present invention.

FIG. 1 is a perspective view of a sub-woofer baffle tray 110 according to an embodiment of the present invention. The tray 110 is arranged to be coupled to an underside 150U of a floor panel 150 of a motor vehicle floorpan assembly 155 (FIG. 2) thereby to define a box portion of a sub-woofer system.

The tray 110 is of substantially U-shaped, square cross-section defined by two elongate, parallel side walls 110A, 110C and a basal wall 110E. A pair of end walls 110B, 110D are provided at opposed ends of the side walls 110A 110C and basal wall 110E. Lateral web members 110W are provided within the tray 110, oriented transverse to a longitudinal axis thereof in order to increase a stiffness of the tray 110. This allows a reduction in thickness of walls 110A, 110C, 110B, 110D of the tray 110 thereby reducing a weight of the tray 110. In some embodiments the tray 110 is formed from a glass reinforced plastics (GRP) material.

Figure 3:
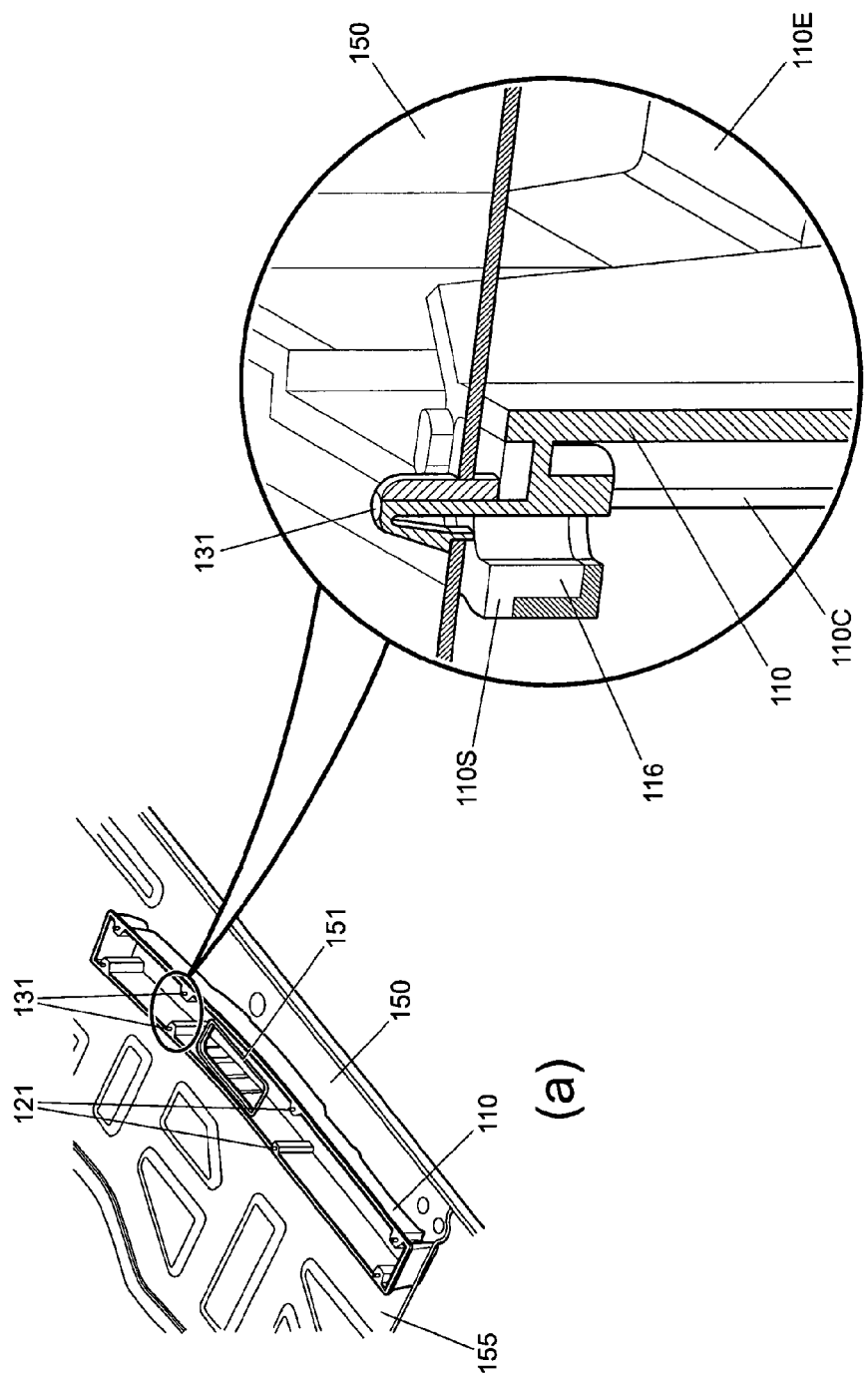
FIG. 3 is a schematic illustration of (a) the sub-woofer baffle tray coupled to the floor panel and (b) a close-up view of a coupling member holding the baffle tray and floor panel in a spaced apart relationship.

A free peripheral edge 110P of the tray 110 defined by free edges of the side walls 110A, 110C and end walls 110A, 110B is provided with a seal member 110S in the form of a layer of heat-activated mastic. The seal member 110S is set in a channel 116 formed along the peripheral edge 110P of the aperture (FIG. 3). The mastic from which the seal member 110S is formed is arranged to expand by up to around 2-3 times its volume at least when heated to a seal member activation temperature of around 180° C.

Figure 5:
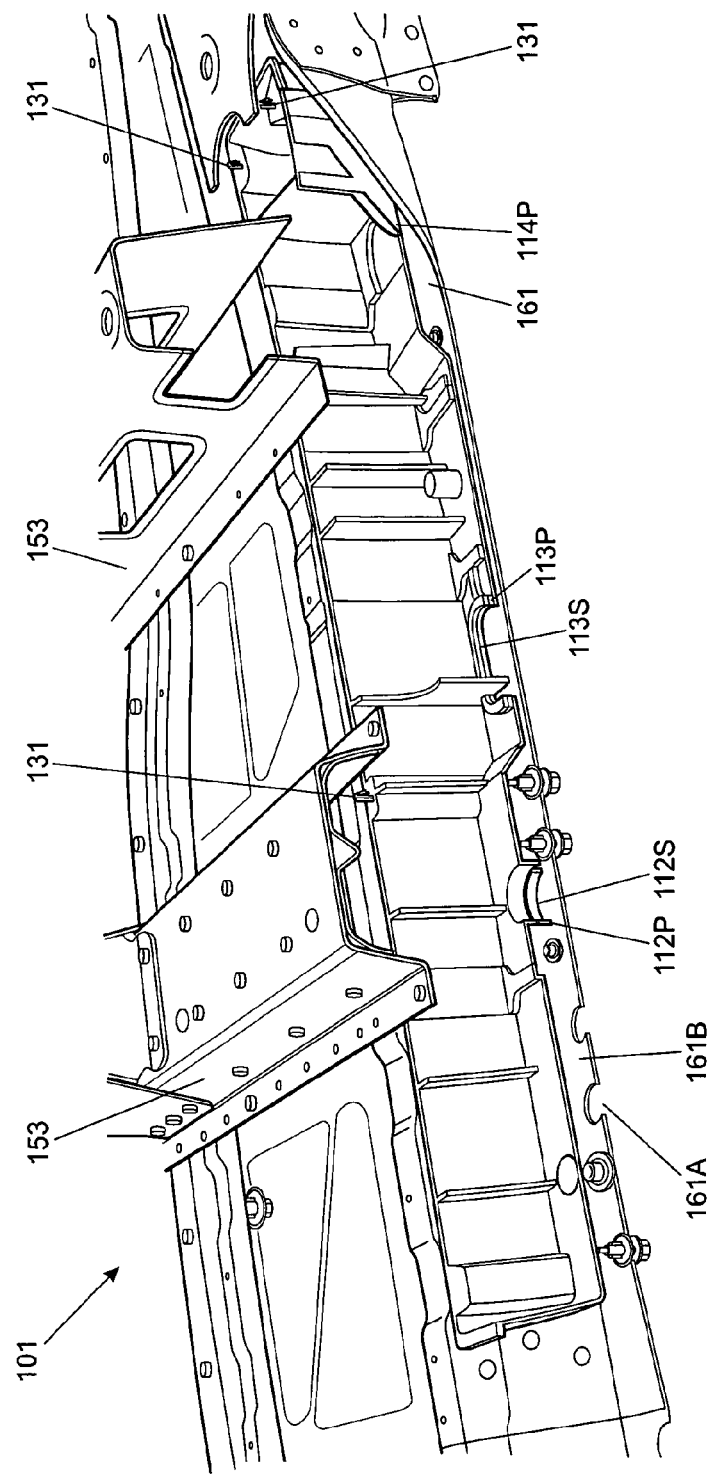
FIG. 5 is a cut-away view of a portion of a vehicle body assembly showing the tray assembly enclosed within a longitudinal member of the ladder frame assembly.
Figure 6:
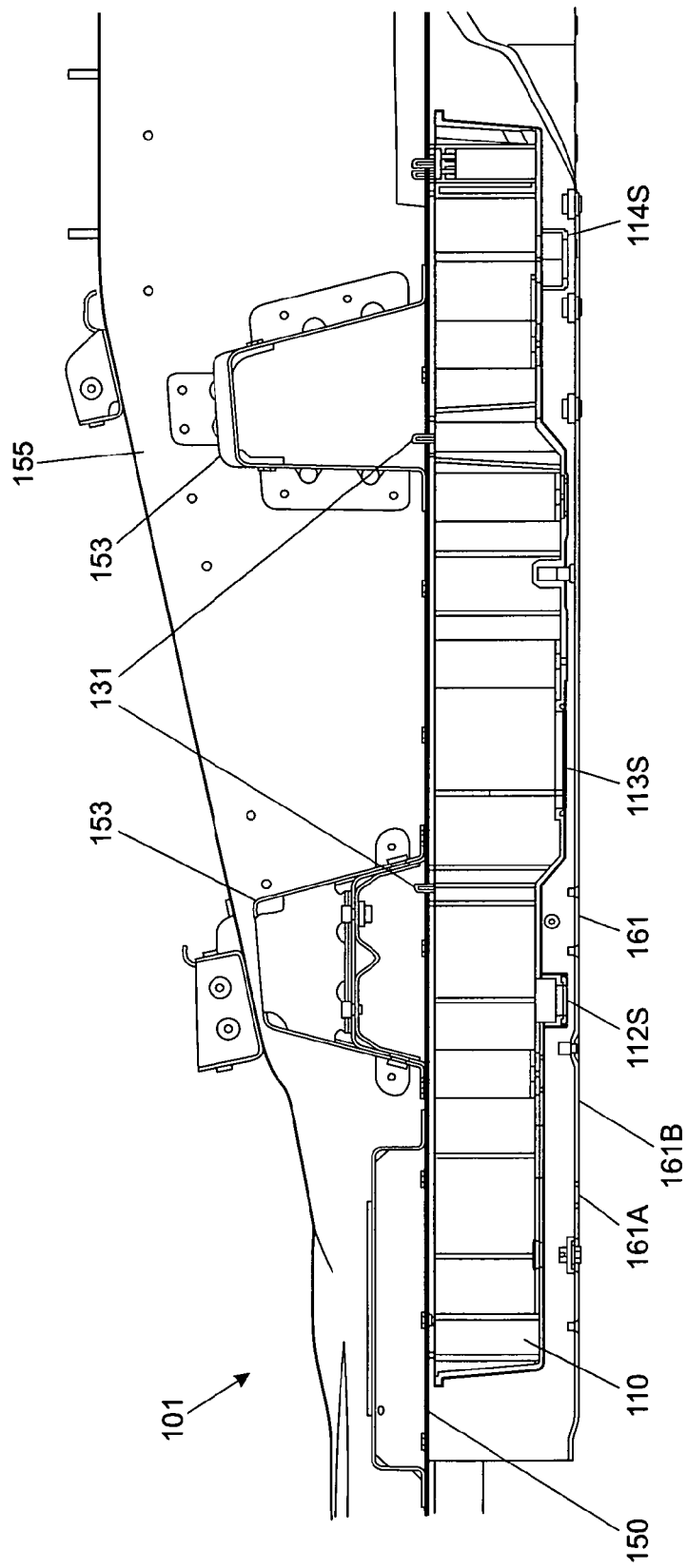
FIG. 6 is a cross-sectional view of the portion of the vehicle body shown in FIG. 5 showing the tray assembly enclosed within the longitudinal member of the ladder frame assembly.
Figure 7:
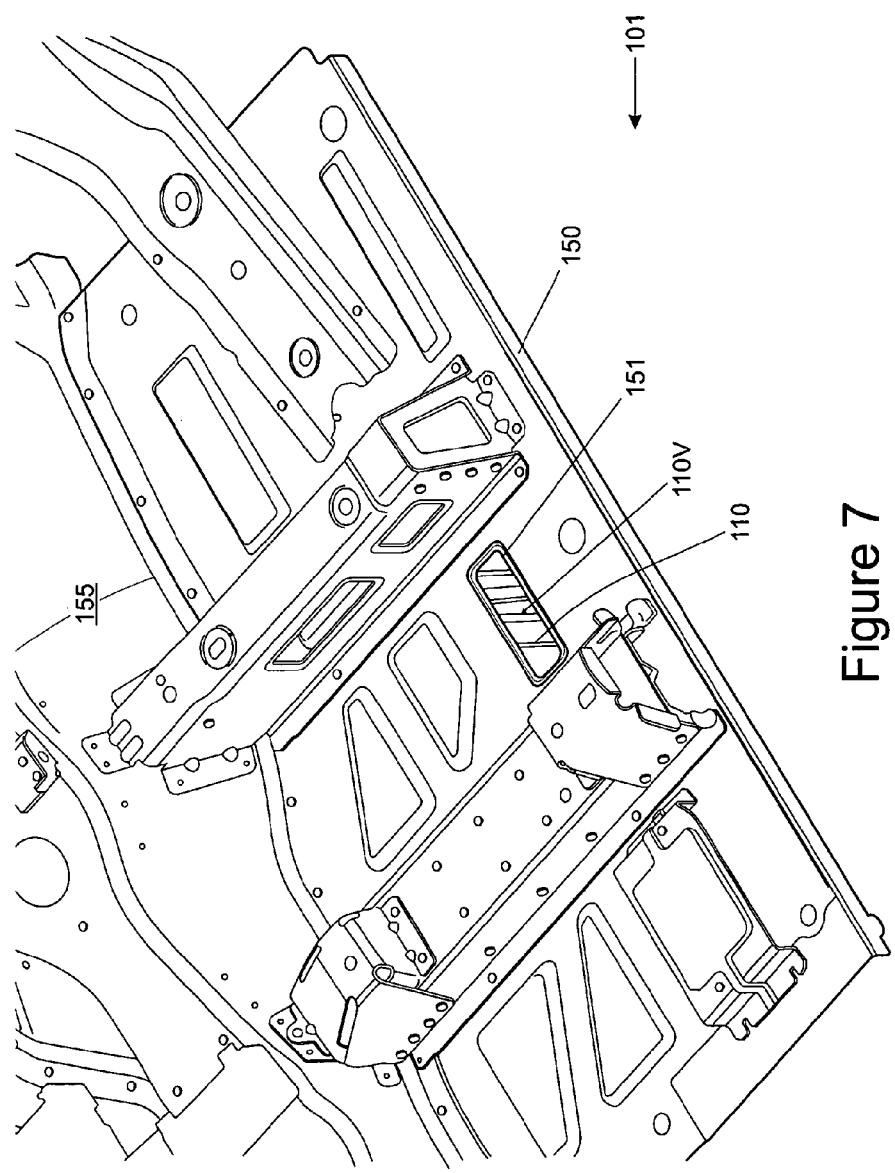
FIG. 7 is a perspective view of the floorpan assembly from above.

The basal wall 110B of the tray 110 has three drain apertures 112, 113, 114 provided therein. A seal member 112S, 113S, 114S is provided around a peripheral edge of each of the apertures 112, 113, 114. The seal members 112S, 113S, 114S are provided on an outer face of the basal wall 110 facing in an opposite direction from the seal member 110S. Like the seal member 110S, the seal members 112S, 113S, 114S shown in detail in FIG. 5 and FIG. 6 are similarly provided in channels around their respective apertures 112, 113, 114.

Six coupling elements 131 in the form of clips of the fir-tree type are provided around the peripheral edge 110P of the tray 110. The clips are arranged to allow the tray 110 to be coupled to the underside of the floor panel 150 such that a gap exists between the seal member 110S and the panel 150 once the two are coupled. FIG. 3 shows a coupling element 131 supporting the tray 110 in juxtaposition with the floor panel 150. Any suitable clip or other mechanical fixing allowing the tray 110 to be supported in spaced apart relationship with the panel 150 may be used.

It can be seen that the coupling element 131 passes through a portion of the seal member 110S such that the seal member 110S surrounds the coupling element 131 at the location at which the element 131 passes through the seal member 110S. This feature has the advantage that a fluid tight seal may be formed around the coupling element 131 once the seal member 110S has expanded after passing through a paint bake oven. The formation of the fluid tight seal has the advantage that it prevents fluid external to the tray 110 from passing from a side of the floor panel 150 on which the tray 110 is located through the floor panel 150 to the opposite side of the floor panel 150, via the tray 110.

Figure 2:
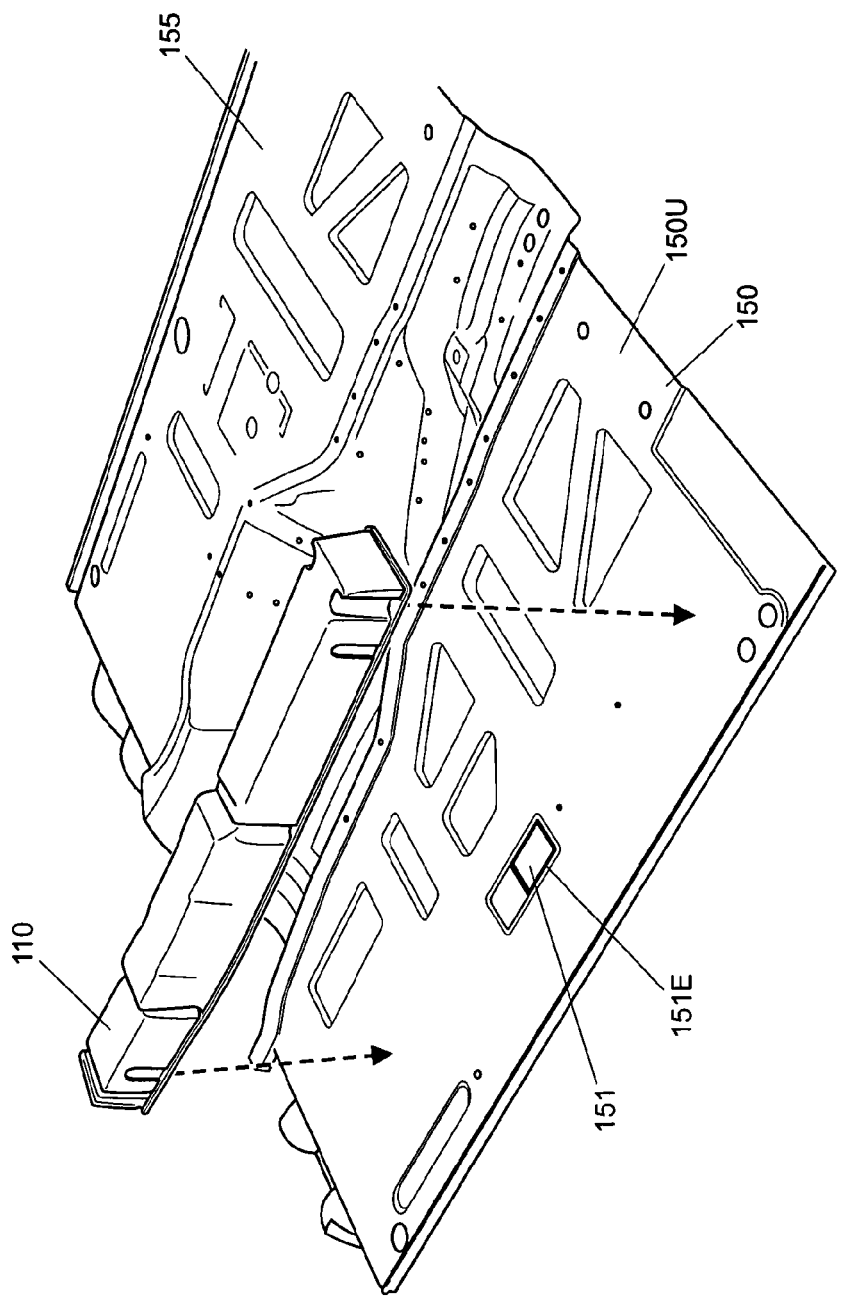
FIG. 2 is a schematic illustration of a process in which the sub-woofer baffle tray is coupled to an underside of a floorpan assembly of a motor vehicle.

During assembly of the vehicle in which the tray 110 is to be incorporated, the tray 110 is coupled to the underside 150U of the floor panel 150 by means of the coupling elements 131 as shown in FIG. 2. An aperture 151 in the floor panel 150 allows convenient access to the cavity defined by the tray 110 from within the vehicle as described below.

Figure 4:
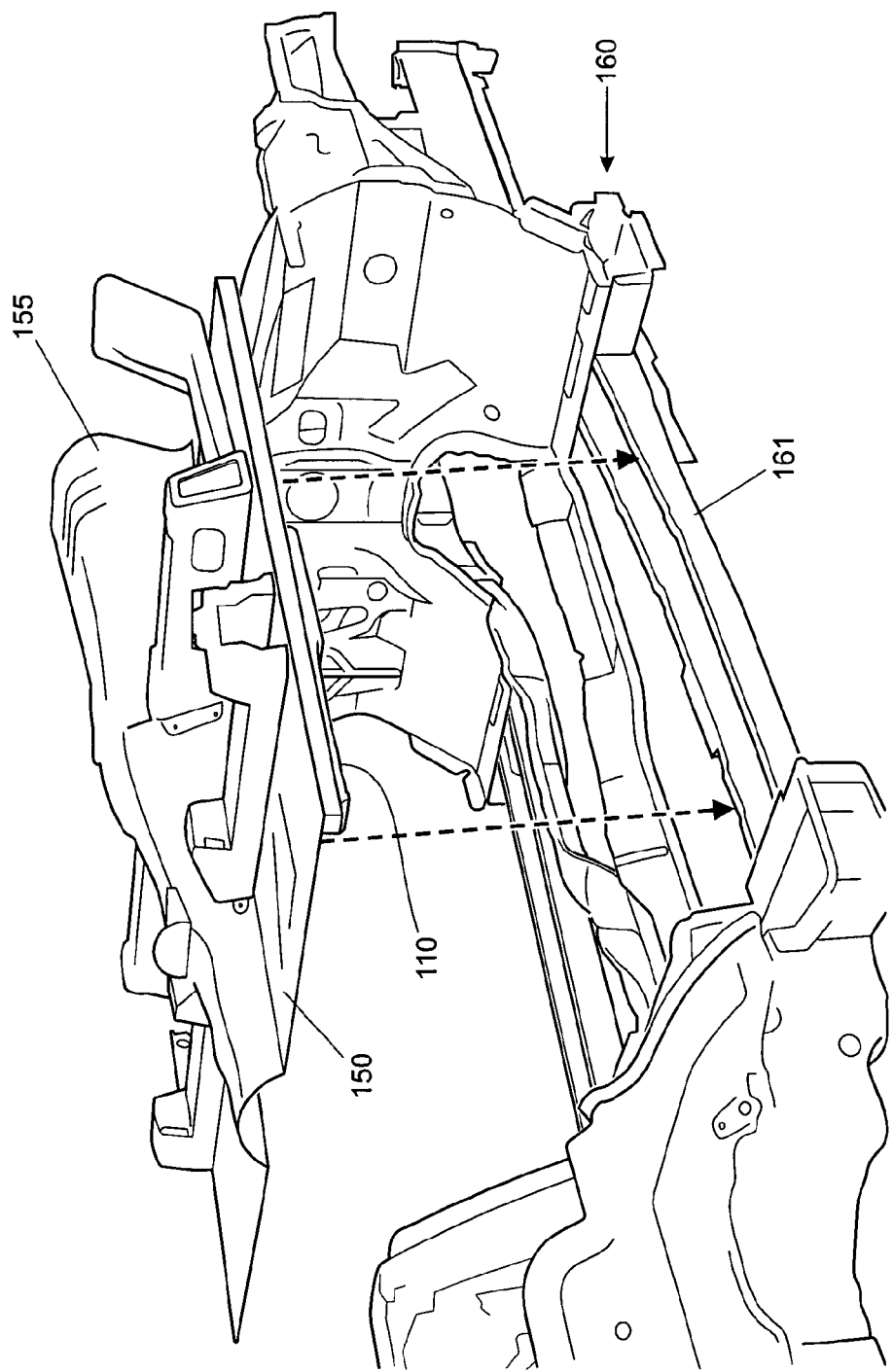
FIG. 4 is a schematic illustration of a process in which the floorpan assembly is coupled to a ladder frame assembly of the vehicle to form a vehicle body assembly.

Subsequently, the floorpan assembly 155 is joined to longitudinal members 161 (or ladder members 161) of a ladder frame assembly 160 to form a vehicle body assembly 101 as shown in FIG. 4 and FIG. 5. The floorpan assembly 155 is joined permanently to the longitudinal members 161 (for example by welding, mechanical fixing elements or any other suitable method) such that the tray 110 is contained within one of the longitudinal members 161. The longitudinal members 161 have a substantially U-shaped section. An external form of the tray 110 corresponds to the internal form of the longitudinal member 161 within which it is provided.

The longitudinal member 161 has a drain aperture 161A formed in a basal portion thereof as shown in FIG. 5. It can also be seen from FIG. 5 that the coupling elements 131 pass through the floor panel 150 from the tray 110 and are enclosed by floor panel cross-members 153 running in a lateral (east-west) direction across the floor panel 150. This feature has the advantage that a risk that clashes occur between the exposed portions of the seal members 131 and components of the body assembly 101 is reduced or substantially eliminated.

Once the floorpan assembly 155 has been joined to the ladder frame assembly 160 the vehicle body assembly 101 is subject to an electro-coating process such as an electrophoretic deposition process commonly known as an e-coat dipping process. The vehicle body assembly 101 is dipped in a bath of e-coat fluid such as a primer, paint or any other suitable fluid in order to form a coating of e-coat fluid over the vehicle body assembly 101.

The aperture 151 in the floor panel 150 is arranged to allow e-coat fluid to flood the internal volume defined by the tray 110 when the assembly 101 is dipped in the fluid. The drain apertures 112, 113, 114 provided in the basal wall 110B of the tray 110 and the aperture 161A formed in the longitudinal member 161 allow e-coat fluid to flood the volume between the tray 110 and longitudinal member 161 during the e-coat dipping process.

When the body assembly 101 is subsequently removed from the bath of e-coat fluid, excess e-coat fluid is allowed to drain from the assembly 101 through the apertures 151, 112, 113, 114, 161A leaving substantially all surfaces of the floor panel 150 and longitudinal member 161 coated in a layer of e-coat. It is to be understood that in embodiments in which the tray 110 is formed from a plastics or other non-conducting material the tray 110 is unlikely to be coated with e-coat following removal from the bath. In embodiments in which the tray 110 is formed from a conductive material the tray 110 may be arranged to become coated with a layer of e-coat.

Thus it is to be understood that portions of the underside 150U of the floor panel 150 that are enclosed by the tray 110 or longitudinal member 161 may be coated with a layer of e-coat fluid in a coating process performed after the assembly 101 has been formed, whilst still allowing the tray 110 to be sealed against the floor panel 150 thereby forming a sealed internal volume or cavity of the tray 110. This has the advantage that coating of individual components of the assembly 101 before the assembly 101 is formed is not required.

It is to be understood that in some assembly processes it is not possible to perform an e-coating process before the body assembly 101 is formed. In some arrangements this is because the joining method employed is not compatible with coated surfaces.

In some arrangements the body assembly 101 is rotated after removal from the bath of e-coat fluid in order to allow draining of e-coat fluid therefrom. In some arrangements the body assembly 101 is rotated through an angle of substantially 360° after removal from the bath. In some arrangements the body assembly 101 is also rotated whilst the body assembly 101 is submerged in the bath.

It is to be understood that whilst a process has been described in which the body assembly 101 is exposed to an e-coat fluid, in some alternative embodiments the body assembly 101 may be exposed to a fluid other than an e-coat fluid such as an electrolyte of an anodisation process, a cleaning fluid or any other fluid to which it is required to expose the body assembly 101. Processes other than e-coating processes are also useful.

The body assembly 101 is then heated in an oven to allow curing of the e-coat layer. It is to be understood that the body assembly 101 is first heated to a curing temperature at which curing of the e-coat layer takes place, the curing temperature being below the seal member activation temperature. Once curing has taken place the temperature of the assembly 101 is then increased to the seal member activation temperature.

It is to be understood that in some arrangements the body assembly 101 may be heated to a temperature at which curing of the e-coat layer takes place to an extent sufficient to allow activation of the seal members 110S, 112S, 113S, 114S to take place, further curing taking place after the seal members 110S, 112S, 113S, 114S have expanded to seal the respective gaps.

In some arrangements the assembly 101 is heated to the seal member activation temperature over a period of time that is sufficiently long to allow curing of the e-coat layer before the seal member activation temperature is reached.

Once the seal member activation temperature is reached, the heat-activated mastic forming the seal members 110S, 112S, 113S, 114S expands. The seal member 110S around the peripheral edge 110P of the tray 110 expands to seal the gap between the tray 110 and floor panel 150. The seal members 112S, 113S, 114S around the drain apertures 112, 113, 114 in the tray 110 expand to seal the gap between the drain apertures 112, 113, 114 and longitudinal member 161.

Thus it is to be understood that once the seal members 110S, 112S, 113S, 114S have been caused to expand fluid communication between an internal volume of the tray 110 and an environment external to the tray 110 is possible only through the aperture 151 formed in the floor panel 150.

It is to be understood that the seal members 112S, 113S, 114S around the drain apertures 112, 113, 114 are not provided opposite the drain aperture 161A in the longitudinal member 161, and therefore the apertures 112, 113, 114 are closed once the seal members 112S, 113S, 114S have expanded to bridge the gap between the tray 110 and longitudinal member 161.

In some embodiments the aperture 161A in the longitudinal member 161 remains open during a service life of the vehicle in order to allow ventilation of the volume between the tray 110 and the longitudinal member 161. This volume may be referred to as a 'wet' region because if the longitudinal member 161 is immersed in liquid when the vehicle is in use, for example in a wading operation, the volume may become exposed to the liquid.

Figure 8:
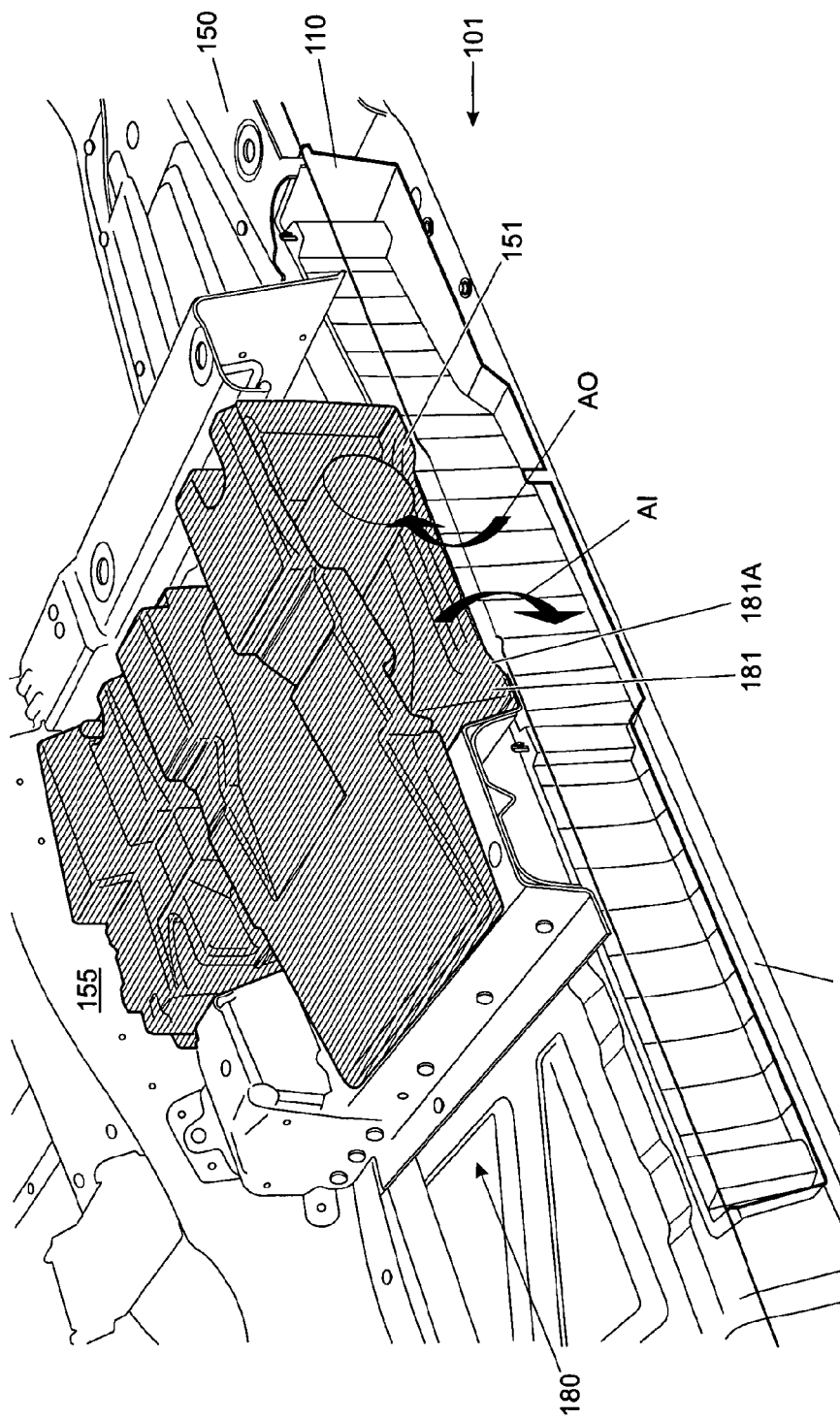
FIG. 8 is a schematic cut-away view of the floorpan assembly following installation of an upper portion of a sub-woofer system.

In a further step of assembly shown in detail in FIG. 8 an upper portion 181 of a sub-woofer system 180 is installed above the tray 110 within a cabin of the vehicle. The upper portion 181 has an aperture 181A that forms a substantially fluid-tight seal with the aperture 151 in the floor panel 150.

It is to be understood that in use the pressure in the sub-woofer baffle tray 110 may range between around 1 atmosphere above atmospheric pressure and 1 atmosphere below atmospheric pressure as air is forced into and out from the baffle tray 110 by a sub-woofer driver. The path of air flowing into (AI) and out from (AO) the sub-woofer baffle tray 110 is illustrated schematically in FIG. 8.

In some embodiments the tray 110 is provided with a further one or more seal members at one or more other locations of an outer surface thereof in order to form a seal bridging the gap between the tray 110 and longitudinal member 161 following activation of the mastic of the seal member(s). This feature allows the tray 110 to be supported at further locations along a length thereof and can be useful in reducing vibration of the tray in use, such as vibration at one or more resonant frequencies of the tray 110.

In the present embodiment three substantially U-shaped seal members 118 are provided at spaced apart locations along a length of the tray 110, the seal members 118 running around an outer surface of the walls 110A, 110E, 110C from one side of the peripheral edge 110P to the other. The presence of these seal members 118 helps to increase a stiffness of the tray 110 in use when installed in the longitudinal member. This feature is particularly useful due to the relatively large changes in pressure that may occur within the tray 110 when in use as described above.

It is to be understood that the use of seal members 110S, 112S, 113S, 114S formed from a heat-activated mastic has the advantage that variations in the size of a gap between the tray 110 and longitudinal member 161 or floor panel 150 can be readily accommodated when the seal members 110S, 112S, 113S, 114S are activated.

It is to be understood that whilst embodiments of the invention have been described in respect of the provision of a sub-woofer baffle, in some alternative embodiments the tray 110 may be used for a different purpose. For example the tray 110 may be arranged to be accessible by a driver or passenger for the purpose of storing items such as personal items or vehicle accessories. In some embodiments the panel may provide a fluid reservoir such as a reservoir for screen-wash or any other suitable liquid. Alternatively or in addition the panel may be employed to store one or more vehicle systems or system components. Other uses or functions are also useful.

Figure 9:
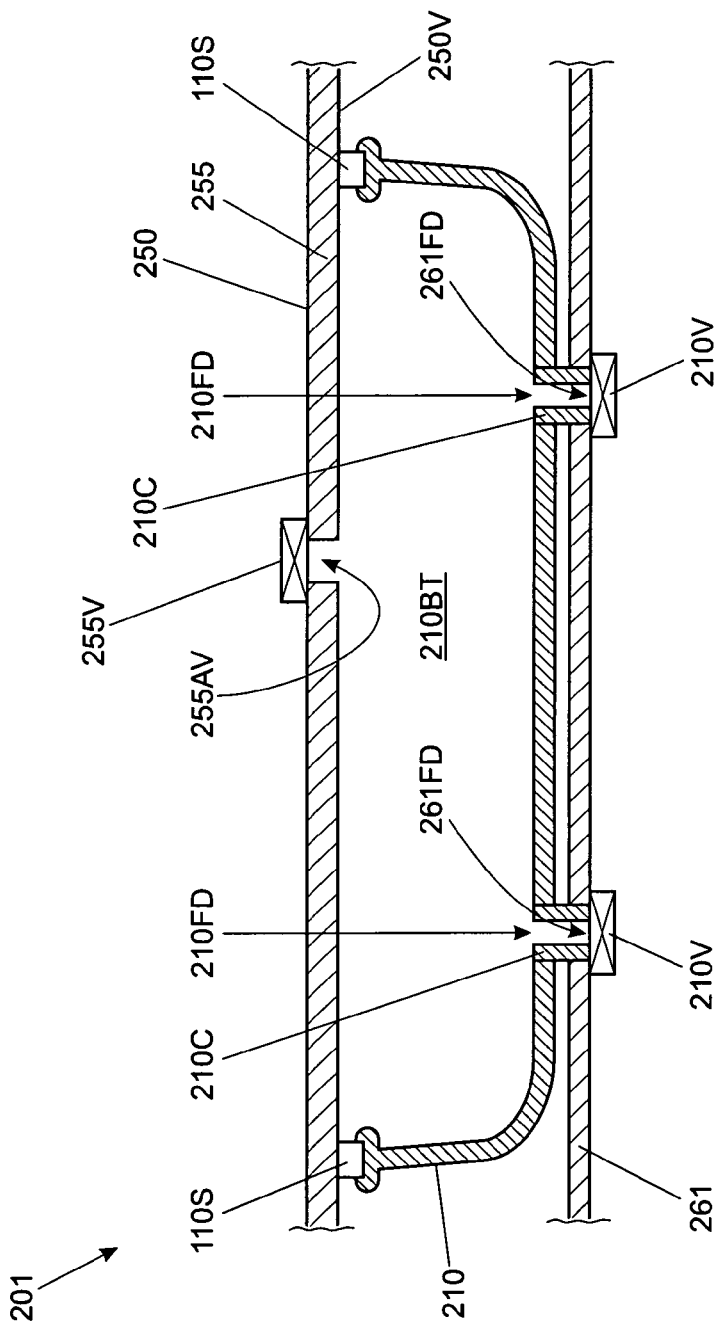
FIG. 9 is a cross-sectional view of a body assembly with a ballast tank installed therein according to an embodiment of the present invention.

FIG. 9 shows a portion of a body assembly 201 in which a tray 210 has been coupled to an underside 250U of a floor panel 250 of a motor vehicle floorpan assembly 255 thereby to define a ballast tank 210BT.

The tank 210BT is enclosed by a longitudinal member 261 of a ladder frame assembly in a similar manner to the tray 110 of the embodiment shown in FIG. 5. The tray 210 has a pair of fluid drain apertures 210FD in a lower surface thereof located directly above a corresponding pair of fluid drain apertures 261FD formed in the longitudinal members 261. Respective fluid conduits 210C are provided to direct fluid into and out from the tank 210BT via respective apertures 210FD, 261FD. Valves 210V are coupled to an underside of the longitudinal members 261 at each of the apertures 261FD for selectively opening and closing the apertures 261FD to allow or prevent flow of fluid into or out from the tank 210BT.

An air vent aperture 255AV is provided in the floor panel 250 of the assembly 201 to which an air vent valve 255V is attached. The vent valve 255V may be opened when it is required to flood the tank 210BT with water or drain water from the tank 210BT.

Each of the valves 210V, 255V may be controlled to open and close by means of a signal from a controller.

In use, if a vehicle is wading in water and it is determined that a reduction in buoyancy of the vehicle is required, the fluid drain valves 210FD and air vent valve 255V may be opened to allow water to flood the ballast tank 210BT. When a sufficient amount of water has been drawn into the tank 210BT the air vent valve 255V may be closed, and optionally the drain valves 210FD. When it is required to empty the tank 210BT the vent valve 255V may be opened (and fluid drain valves 210FD if not already open) to allow water to drain.

It is to be understood that the air vent valve 255V and fluid drain valves 210V could be controlled so as to remain open whilst wading. However if a risk exists that a level of liquid may rise such that water flows through the air vent valve 255 it is advisable to close air vent valve 255V or the fluid drain valves 210FD or all three valves 255V, 210FV in order to prevent flow of water through the air vent valve 255V.

Other arrangements are also useful.

Embodiments of the invention have been described with respect to a monocoque motor vehicle construction. It is to be understood that embodiments of the invention are suitable for use in motor vehicles having an alternative construction such as a body/chassis construction or any other form of construction. Embodiments of the invention are also useful in construction of other articles such as components of buildings, aircraft including fixed and rotary wing aircraft, watercraft including ships and other vessels and many other articles and objects.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of manufacture of an assembly comprising:
   forming an assembly by coupling a first component to a second component in spaced apart relationship therewith by means of coupling means;
   providing thermally activated seal means between the first and second components,
   the first component, second component and seal means being arranged such that a gap exists between the first and second components allowing fluid flow therebetween;
   exposing the assembly to a fluid before subjecting the assembly to heat to form the fluid tight seal;
   subjecting the assembly to heat thereby to cause the seal means to expand and bridge the gap between the first and second components thereby to form a fluid tight seal between the components;
   providing the second component in a shape defining a tray having a free peripheral edge facing the first component whereby expansion of the seal means causes a fluid tight seal to be provided between the first and second components around the peripheral edge of the second component; and
   forming an aperture in the first component thereby to allow access to an interior of the tray defined by the second component;
   wherein the method further comprises providing a third component such that the second component is at least partially enclosed by the first and third components before subjecting the assembly to heat.

2. A method as claimed in claim 1 further comprising the step of coupling the third component to one or both of the first and second components.

3. A method as claimed in claim 1 comprising the step of providing seal means between the third component and one or both of the first and second components such that a gap exists between the third component and said one or both of the first and second components such that fluid may pass through the gap and drain from the assembly before subjecting the assembly to heat.

4. A method as claimed in claim 3 whereby the step of providing seal means between the third component and one or both of the first and second components comprises providing the seal means such that expansion of the seal means causes a fluid tight seal to be formed between the third component and said one or both of the first and second components.

5. A method as claimed in claim 1 comprising the step of providing at least one aperture in the second component to allow flow of fluid through the second component via said aperture.

6. A method as claimed in claim 5 comprising providing a thermally activated seal means around one said at least one aperture in the second component.

7. A method as claimed in claim 5 comprising the step of providing valve means for controlling flow of fluid into or out from one said at least one aperture in the second component in use.

8. A method as claimed in claim 1 comprising providing the second component to define an air cavity of an audio speaker system.

9. An assembly comprising:
   a first component and a second component coupled to one another in spaced apart relationship by means of coupling means;

a third component wherein the first and third components at least partially or substantially fully enclose the second component; and seal means between the first and second components, the first component, second component and seal means being arranged such that a gap exists between the first and second components allowing fluid flow therebetween, wherein the seal means comprises thermally activated seal means arranged to expand upon heating to bridge the gap between the first and second components thereby to form a fluid tight seal between the components, wherein the second component comprises a tray, the seal means between the first and second components being provided around a peripheral edge of the tray, the seal means being arranged on heating to expand away from the peripheral edge of the tray to bridge a gap between the peripheral edge and the first component thereby to form the fluid tight seal therebetween, and wherein an aperture is provided in the first component allowing access to an interior of the tray.

10. An assembly as claimed in claim 9 wherein the second component is provided with at least one aperture therein to allow flow of fluid into or out from the second component.

11. An assembly as claimed in claim 10 wherein thermally activated seal means is provided around one said at least one aperture in the second component, the seal means being arranged to form a seal between the second and third components upon heating.

12. An assembly as claimed in claim 9 wherein the first component comprises a floorpan assembly of a motor vehicle.

13. An assembly as claimed in claim 9 wherein the second component defines an air cavity of a sub-woofer of an audio speaker system.

14. A vehicle, watercraft or aircraft comprising an assembly as claimed in claim 9.

* * * * *